US011669760B2

(12) United States Patent
Goebel

(10) Patent No.: US 11,669,760 B2
(45) Date of Patent: Jun. 6, 2023

(54) WEIGHT ASSIGNMENT FOR FUSION OF PROGNOSTIC ESTIMATORS

(71) Applicant: Palo Alto Research Center Incorporated, Palo Alto, CA (US)

(72) Inventor: Kai F. Goebel, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 682 days.

(21) Appl. No.: 16/717,649

(22) Filed: Dec. 17, 2019

(65) Prior Publication Data
US 2021/0182717 A1  Jun. 17, 2021

(51) Int. Cl.
G06N 7/00      (2023.01)
G01M 99/00   (2011.01)
G06Q 10/20   (2023.01)
G06N 7/02      (2006.01)
G06N 20/00   (2019.01)

(52) U.S. Cl.
CPC .......... *G06N 7/00* (2013.01); *G01M 99/008* (2013.01); *G06Q 10/20* (2013.01); *G06N 20/00* (2019.01)

(58) Field of Classification Search
CPC .......... G06N 7/00; G06N 20/00; G06Q 10/20; G01M 99/008
See application file for complete search history.

(56) References Cited

U.S. PATENT DOCUMENTS

| | | | |
|---|---|---|---|
| 5,210,704 A * | 5/1993 | Husseiny | G01H 1/003 706/912 |
| 7,328,128 B2 | 2/2008 | Bonanni et al. | |
| 7,548,830 B2 | 6/2009 | Goebel et al. | |
| 7,581,434 B1 * | 9/2009 | Discenzo | G01N 33/2888 73/53.01 |
| 8,494,810 B2 * | 7/2013 | Goldfine | G07C 3/00 702/183 |
| 8,725,456 B1 * | 5/2014 | Saha | G05B 23/0283 702/182 |
| 10,814,883 B1 * | 10/2020 | Dixit | B60W 50/02 |
| 10,964,130 B1 * | 3/2021 | Dixit | G05B 23/0283 |
| 2002/0038199 A1 * | 3/2002 | Blemel | F17D 5/02 702/183 |
| 2003/0120402 A1 * | 6/2003 | Jaw | G01M 15/00 702/182 |
| 2004/0049715 A1 * | 3/2004 | Jaw | H04L 41/0681 714/43 |

(Continued)

OTHER PUBLICATIONS

European Extended Search Report from EP Application No. 20211128.2 dated May 11, 2021, 8 pages.

*Primary Examiner* — Nicholas Augustine
(74) *Attorney, Agent, or Firm* — Mueting Raasch Group

(57) ABSTRACT

A system for predicting remaining useful life of a component implements a set of estimation models that generate future damage estimates for the component. The system detects damage to the component and estimates the magnitude of the current damaged. An error processor estimates the between each future damage estimate and the magnitude of current damage. A weight calculator calculates weights for the future damage estimates, wherein each weight is inversely proportional to the error. A fusion processor applies the weights respectively to future damage estimates of the estimators and combines the weighted future damage estimates.

21 Claims, 15 Drawing Sheets

(56) References Cited

U.S. PATENT DOCUMENTS

| | | | |
|---|---|---|---|
| 2013/0096898 A1* | 4/2013 | Usadi | G01V 99/005 |
| | | | 703/10 |
| 2016/0281607 A1* | 9/2016 | Asati | F02C 7/26 |
| 2018/0028079 A1* | 2/2018 | Gurevich | A61B 5/0261 |
| 2018/0276861 A1* | 9/2018 | Wright | G06F 16/27 |
| 2018/0284758 A1* | 10/2018 | Cella | G05B 19/41865 |
| 2018/0336481 A1* | 11/2018 | Guttmann | G06N 3/045 |
| 2019/0172564 A1* | 6/2019 | Chandra | G06N 20/00 |
| 2019/0294990 A1* | 9/2019 | Lopez De Prado | G06N 20/00 |
| 2020/0103894 A1* | 4/2020 | Cella | G05B 23/0291 |
| 2021/0357555 A1* | 11/2021 | Liu | G06F 30/27 |

* cited by examiner

WEIGHT ASSIGNMENT FOR FUSION OF PROGNOSTIC ESTIMATORS

BACKGROUND

Prognostic estimation can be useful to estimate the remaining useful life of various types of equipment. Remaining useful life estimates allow equipment operators to make informed decisions about scheduling maintenance, decommissioning equipment, and avoiding equipment downtime.

BRIEF SUMMARY

Some embodiments are directed to a system comprising an estimation processor configured to implement a set of diverse estimation models that generate future damage estimates for a component. Each estimation model generating a future damage estimate, $y_i$, for the component at each of a plurality of life units, i, of the component based on one or more anticipated stressors of the component. The system includes at least one damage detector configured to detect damage to the component. A damage estimator is configured to estimate a magnitude of current damage, $gt_i$, of the component for each life unit, i, based at least in part on the detected damage. An error processor is configured to estimate an error, $e_i$, between each future damage estimate, $y_i$, and the magnitude of current damage, $gt_i$, for each life unit, i. A weight calculator calculates weights, $w_i$, for the future damage estimates, each weight being inversely proportional to the error. A fusion processor is configured to combine the future damage estimates of the estimation models. The fusion processor applies the calculated weights respectively to future damage estimates providing weighted future damage estimates and generates a combined future damage estimate by combining the weighted future damage estimates. The fusion processor predicts a remaining useful life of the component based on the combined future damage estimate.

According to some aspects, the system includes at least one model of the component and the magnitude of current damage is based on estimations obtained from the model. For example, the model may be a physics model of the component.

In some aspects of the system, at each life unit, i, the error, $e_i$, for each damage estimate, $y_i$, is based on the equation $e_i = (gt_i - y_i)^2$.

According to some aspects of the system, at each life unit, i, the error, $e_i$, is smoothed to filter the higher order changes of the error. For example, the filter is an exponential moving average filter with a smoothing constant, $\alpha$.

According to some aspects at each life unit, i, the weight, $w_i$, for the future damage estimate, $y_i$, is a maximum of errors of future damage estimates of the estimation models 1 to N, $\max(e_1, e_2, \ldots, e_N)$ for the life unit, i, divided by an absolute value of the error, $|e_i|$ for the future damage estimate, $y_i$.

In some implementations, the weight calculator is configured to skew the weights toward underestimation of the future damage.

The weight calculator can be configured to calculate relatively larger weights for damage estimates of estimation models that underestimate the remaining useful life of the component and calculate relatively smaller weights for damage estimates of estimation models that overestimate the remaining useful life of the component.

According to some aspects, at each life unit, i, the error $e_i$ for each damage estimate, $y_i$, is based on the equation $$e_i = \left\{ \exp^{-\frac{y_i - gt_i}{scalar1}} \right\}$$

if $y_i - gt_i < 0$, and $$\left\{ \exp^{-\frac{y_i - gt_i}{scalar2}} \right\},$$

otherwise.

For example, scalar1=10 and scalar2-0.4.

According to some scenarios, at each life unit, i, the weight, $w_i$, for the future damage estimate, $y_i$, is a maximum of errors of future damage estimates of the estimation models 1 to N, $\max(e_1, e_2, \ldots, e_N)$ for the life unit, i, divided by an absolute value of the error, $|e_i|$ for the future damage estimate, $y_i$.

In some implementations, the system includes a memory that stores knowledge of overestimation of future damage by at least one estimation model and knowledge of underestimation of future damage by at least another estimation model.

The weights for the first estimator can be based on magnitudes of the overestimation of the future damage and the weights for the second estimation model can be based on magnitudes of the underestimation of the future damage.

In some configurations, the estimation processor is configured to update at each life unit at least some of the estimation models based on the magnitude of current damage prior to generating the future damage estimates.

The system can include a stage of life estimator configured identify multiple stages of life of the component and to calculate the weights based on a current stage of life of the component. For example, the stage of life estimator may identify multiple stages of life of the component. Each of the stages can be identified based on a particular magnitude of current damage, $gt_i$. The stage of life estimator may be configured to calculate the weights based on whether the current stage of life of the component is early life, middle life, or late life.

According to some aspects, the stage of life estimator is configured to identify and early life stage and one or more later life stages. The early life stage is one in which the component has not experienced a fault condition that exceeds a predetermined fault threshold. The later life stages are ones in which the component has experienced a fault condition that exceeds a predetermined fault threshold.

According to some aspects, the system includes a reasoner processor configured to detect a fault condition of the component. The reasoner processor may also confirm the fault condition after detecting it, e.g., to prevent spurious detection. For example, the reasoner processor may confirm the fault condition of the component by delaying a final confirmation of the fault condition for additional life units after the fault condition is initially detected to determine if the fault condition persists. The reasoner processor may detect the fault condition of the component using a first source of information and confirm the fault condition using a second source of information that is different from the first source of information.

The reasoner processor can calculate a prognostic horizon of the remaining useful life of the component in response to the fault condition. The reasoner processor can be configured to detect the fault condition based on the future damage estimates.

According to some aspects, the weight calculator is configured to calculate the weights based on one or both of the prognostics horizon and a life stage of the component within the prognostic horizon. For example, the weight calculator may calculate the weights based on one of multiple stages of life of the component within the prognostic horizon.

The reasoner processor may be configured to update the prognostic horizon based on changes in anticipated stressors of the component and/or the magnitude of current damage, $gt_i$. The weight calculator can calculate the weights based on one of multiple stages of life of the component that occur after the updated prognostic horizon.

In some implementations, a training subsystem configured to train at least one estimation model. The training subsystem can be configured to train at least one estimation model to overestimate the remaining useful life of the component and/or to underestimate the remaining useful life of the component.

In some implementations, the estimation processor is configured to detect outlier future damage estimates. In these implementations, the weight calculator is configured to set the weights corresponding to the outlier future damage estimates to zero.

Some embodiments are directed to a method of predicting a remaining useful life of a component. A set of diverse estimation models that generate future damage estimates is implemented for a component. Each estimation model generates a future damage estimate, $y_i$, for the component at each of a plurality of life units, i, based on one or more anticipated stressors of the component; The damage to the component is detected and a magnitude of current damage, $gt_i$, of the component for each life unit, i, is estimated based at least in part on the detected damage. An error, $e_i$, between each future damage estimate, $y_i$, and the magnitude of current damage, $gt_i$, for each life unit, i, is estimated. Weights, $w_i$, for the future damage estimates, are calculated. Each weight is inversely proportional to the error. The future damage estimates are combined. Combining the future damage estimates involves applying the calculated weights respectively to future damage estimates providing weighted future damage estimates and generating a combined future damage estimate by combining the weighted future damage estimates. The remaining useful life of the component is predicted based on the combined future damage estimate. For example, the magnitude of current may be measured or estimated. Estimating the magnitude of the current damage can be based on a physics model of the component.

According to some aspects, at each life unit, i, the error $e_i$ for each damage estimate, is based on the equation $e_i=(gt_i-y_i)^2$. According to some aspects, at each life unit, i, the error, $e_i$, is an exponential moving average with a smoothing constant, $\alpha$. According to some aspects, at each life unit, i, the weight, $w_i$, for the future damage estimate, $y_i$, is a maximum of errors of future damage estimates of the estimation model 1 to N, $\max(e_1, e_2, \ldots, e_N)$ for the life unit, i, divided by an absolute value of the error, $|e_i|$ for the future damage estimate, $y_i$.

In some implementation, calculating the weights comprises skewing the weights toward overestimation of the future damage. For example, relatively larger weights can be calculated for the future damage estimates of estimation models that overestimate the future damage to the component. Relatively smaller weights can be calculated for future damage estimates of estimation models that underestimate the future damage to the component.

The method can include storing knowledge of overestimation of the future damage by one or more first estimation models and knowledge of underestimation of the future damage by one or more second estimation models. The weights can be calculated based on the knowledge of overestimation or underestimation.

The method can include storing knowledge of magnitudes of overestimation of the future damage estimated by one or more first estimation models and knowledge of magnitudes of underestimation of the future damage estimated by one or more second estimation models. Weights for the first estimation models can be calculated based on the magnitudes of overestimation of the future damage. Weights for the second estimation models can be based on the magnitudes of the underestimation of the future damage.

Prior to generating the future damage estimates the method can include updating at each life unit at least some of the estimation models based on the magnitude of current damage.

The method may include identifying multiple stages of life of the component and calculating the weights based on a current stage of life of the component. The method can include calculating a prognostic horizon of the remaining useful life and calculating the weights during the prognostic horizon. The prognostic horizon may be calculated in response to the detection of a fault condition. The method can include confirming the fault condition after it is detected. For example, the fault condition can be confirmed by delaying a final confirmation of the fault condition for additional life units after the initial detection of the fault so as to determine if the fault condition exists. For example, the fault condition can be detected using a first source of information and can be confirmed using a second source of information that is different from the first source of information. The fault condition can be detected based on the future damage estimates.

According to some implementations of the method, a first process is used to calculate weights before the prognostic horizon and a second process is used to calculate weights during the prognostic horizon period. Multiple stages of the component can be identified, before and/or during the prognostic horizon, wherein the weights are calculated based on the stage of life of the component. The prognostic horizon can be updated based on changes the anticipated stressors of the component. The weights may be re-calculated after the prognostics horizon is updated. The prognostic horizon can be updated based on the magnitude of current damage, $gt_i$.

According to some aspects of the method, at least one estimation model is trained, e.g., by machine learning. The estimation model may be grained to overestimate or underestimate the future damage to the component, for example.

According to some aspects, the method involves setting the weights of one or more outlier future damage estimates to zero.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 1:
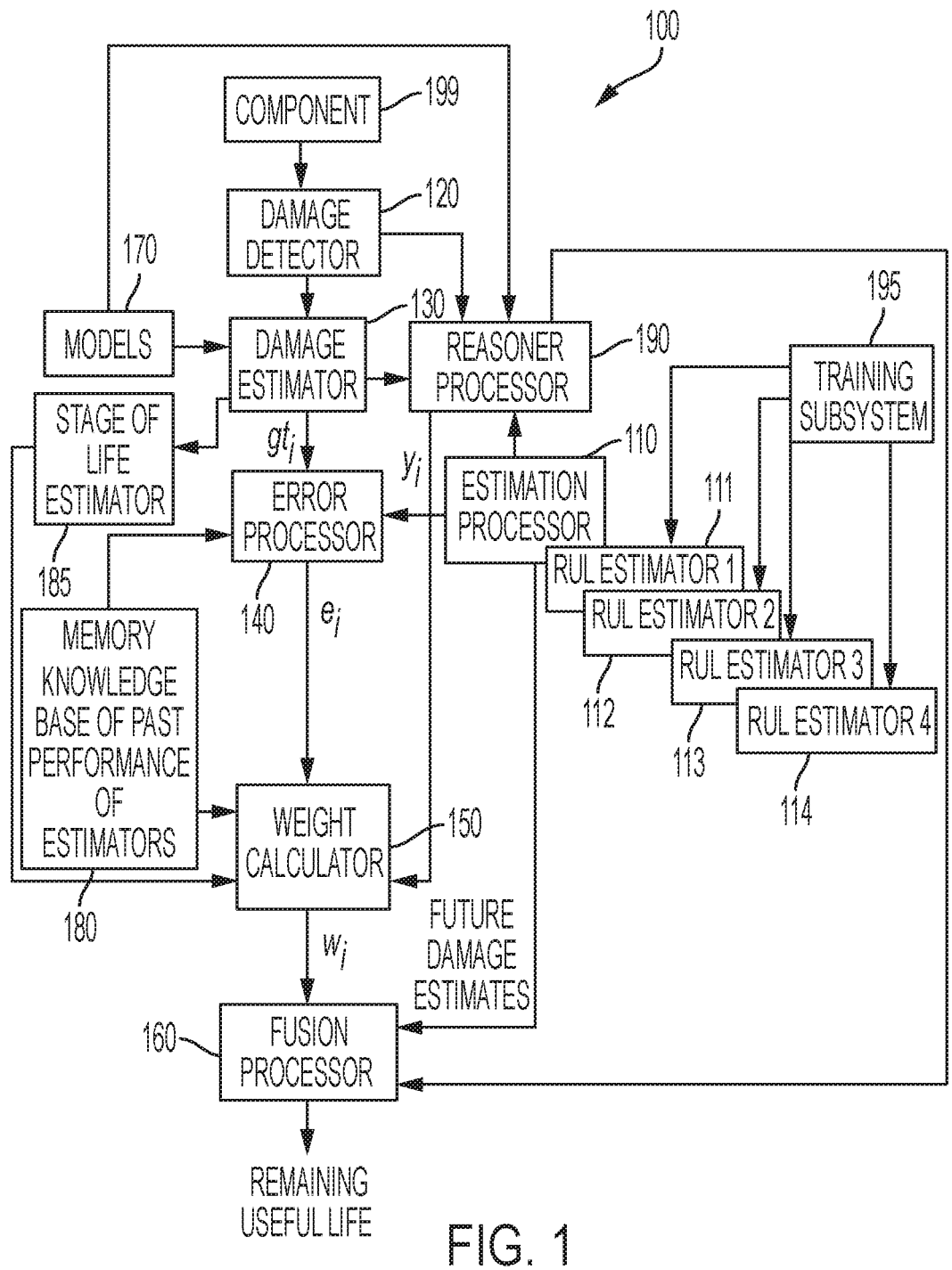
FIG. 1 is a block diagram of a system for estimating remaining useful life of a component in accordance with some embodiments.

The approaches described herein relate to the field of making predictions of remaining useful life (RUL) for some type of component, e.g., pump, valve, transformer, engine, medical system, structural member, battery, etc. Such predictions are particularly important in the field of condition based maintenance (CBM) because this predictive information allows the scheduling of maintenance at a time of minimal operational disruption, thereby saving cost compared to unscheduled, reactive maintenance. For the purpose of scheduling maintenance and preventing component failure it is useful to have an accurate estimation of remaining life of the component. Since component failure is still in the future at the time of the estimation, the quality of the estimation can vary. Increasing the prediction accuracy for any particular estimation model can be challenging. The disclosed approaches enhance RUL estimation accuracy by considering a number of different types of estimation models that estimate the remaining useful life of the component. The outputs of the estimation models are aggregated to provide a fused estimate that is on average more accurate than the estimate of any of the individual estimation models.

The remaining useful life of the component can be predicted based on an estimate of the future damage to the component. The estimators may employ fundamentally different approaches to provide the future damage estimates of the component. For example, one or more estimators may operate from first principles of the physics of the system and/or fault propagation for given operating and environmental conditions to provide the future damage estimates. Alternatively or additionally, one or more estimators may operate from models based on empirical data gained through performing a number of experiments to provide the future damage estimates or from having collected trajectories of data relating to past failures.

Aggregating the future damage estimates produced by the estimators involves assigning weights to the future damage estimates. The weights are applied to the estimates of future damage prior to aggregating the weighted estimates. Aggregating information from multiple estimators is motivated by the fact that averaging a large number of information sources often times tends towards the correct result. This is embodied in the phenomenon of the "wisdom of the crowd" which gives the right answer more often than not—with the understanding that a right answer cannot be guaranteed. Where the number of information points is small (i.e., lacking statistical significance), it may still be desirable to aggregate the information from different information sources. The fundamental thinking is that knowledge about weaknesses of one information source can be made up with knowledge about a strength of another information source. In that case, understanding the strengths and weaknesses of the information sources allow these to be traded off appropriately through weighting. Therefore, finding and assigning the right weights to the information sources is useful for arriving at good performance.

In the context of estimating remaining useful life, some of the considerations are to make sure that outlier opinions (e.g., information sources that appear to be diverging inexplicably from expected behavior) are treated with caution (and possibly given a much smaller weight). Often times, remaining life estimators behave well in some region of the remaining life estimation, and not so well in other regions. In particular, when end of life is being approached, individual estimators may sometimes behave poorly because additional damage modes become dominant which may not have been modeled explicitly or for which not enough examples have been collected for training purposes. This is undesired because a component that is close to end-of-life is being tracked more closely and mitigating decisions are made based on the information at hand. Systems and methods for calculating dynamic weight assignment used in combining estimators for remaining useful life are discussed below.

FIG. 1 is a block diagram of a system 100 configured to estimate the remaining useful life of a component 199 by combining the outputs of a diverse set of RUL estimation models 111, 112, 113, 114, which are also referred to herein as "estimators." An estimation processor 110 is configured to implement the estimators 111, 112, 113, 114, each estimator 111, 112, 113, 114 providing estimates of future damage over the remaining life of the component 199. Although in the block diagram of FIG. 1, four estimators 111, 112, 113, 114 are illustrated, it will be appreciated that the number, N, of diverse estimators implemented in the system 100 can in general be fewer than four or more than four. Each estimator 111, 112, 113, 114 may use a different algorithm to generate an estimation of future damage, $y_i$, for the component 199 for each life unit, i. A life unit, i, can be a unit of time, a component cycle, of any other unit that can be used to quantify the consumption of the life of the component 199. Each estimator 111, 112, 113, 114 generates future damage estimates, $y_i$, based on one or several stressors such as anticipated load conditions of the component 199 and/or anticipated environmental conditions of the component 199.

The system 100 includes at least one damage detector 120 configured to detect damage to the component 199. According to some embodiments, the damage detector 120 can comprise one or more sensors configured to respectively sense one or more performance parameters of the component 199 and to generate a signal representing those performance parameters. In one example, the component 199 may be a battery, the performance parameter may be internal strain within the battery which is measured by a sensor placed within the battery. In another example, the performance parameter may be battery voltage that is measured externally to the battery, in yet other examples, the performance parameter may be corrosion of a structural member, the spall size within a bearing, or a crack length in a structural component.

The system 100 can include a damage estimator 130 that provides an estimate of the magnitude of current damage, $gt_i$, of the component for each life unit, i, of the component based at least in part on the detected damage. In some scenarios, the damage estimator 130 may trend the performance parameters provided by the damage detector 120 and estimate damage based on trends. The damage estimator 130 may take base the current damage estimate on information from sources other than the sensor 120, such as using a physics model 170 of the component 199, taking into account the past and present load conditions of the component 199, the past and present environmental conditions of the component 199 and/or other factors. The output of the damage estimator represents the estimated current damage of the component for each life unit, $gt_i$, which is also referred to as ground truth for that life unit.

An error processor 140 estimates an error, $e_i$, between the future damage estimate, $y_i$, of each of the estimators 111, 112, 113, 114 and the magnitude of damage, $gt_i$, produced by the damage estimator 130 for each life unit, i. (The magnitude of damage, $gt_i$, is also referred to herein as ground truth.) For example, the error, $e_{ni}$, for estimator n at life unit, i, can be written, $e_{ni}=(gt_i-y_{ni})$, where, in the illustrated example, n is an integer from 1 to 4, the integer corresponding to one of the estimators 111, 112, 113, 114. In general, the error, $e_{ni}$ is a measure of performance of the $n^{th}$ estimator at the life unit, i.

A weight calculator 150 calculates weights, $w_{ni}$, for the future damage estimates, $y_{ni}$, for each estimator at each life unit, wherein the weights are based on the estimated error. In some embodiments each weight, $w_{ni}$, is based on a reciprocal of the error.

According to some aspects, the estimation processor 110 may be configured to identify outlier future damage estimates provided ty the RUL estimators 111, 112, 113, 114. The outlier future damage estimates may be identified by comparing the future damage estimates to outlier criteria. The outlier criteria which can be based on sudden changes in the trajectory produced by the estimator. For example, future damage estimates of an estimator having values that are too far away from the values of surrounding future damage estimates of the estimator may be identified as outliers. When outlier future damage estimates are identified, the weight calculator 150 can set the weights corresponding to the outlier future damage estimates to zero. According to some embodiments, the estimation processor 110 may determine that one of the estimators is consistently producing outlier future damage estimates. In this scenario, the estimation processor 110 may set all of the weights for the future damage estimates for the outlier estimator to zero or may otherwise ignore the output of the outlier estimator.

A fusion processor 160 combines the future damage estimates of the estimators 111, 112, 113, 114. The combining may be accomplished by summing or by other aggregation techniques. To combine the future damage estimates, the fusion processor 160 first applies the weights to the future damage estimates producing weighted future damage estimates, $w_{ni}y_{ni}$, for estimators n=1 to N for each life unit, i. The fusion processor 160 then combines the weighted future damage estimates to produce a fused future damage estimate. In one example, at life unit, i, the fused future damage estimate for this example may be written, $$f_i=w_{1i}y_{1i}+w_{2i}y_{2i}+w_{3i}y_{3i}+w_{4i}y_{4i}. \qquad [1]$$

The remaining useful life of the component 199 at each life unit, i, can be predicted by the fusion processor 160 based on the fused damage estimate, $f_i$.

Figure 2:
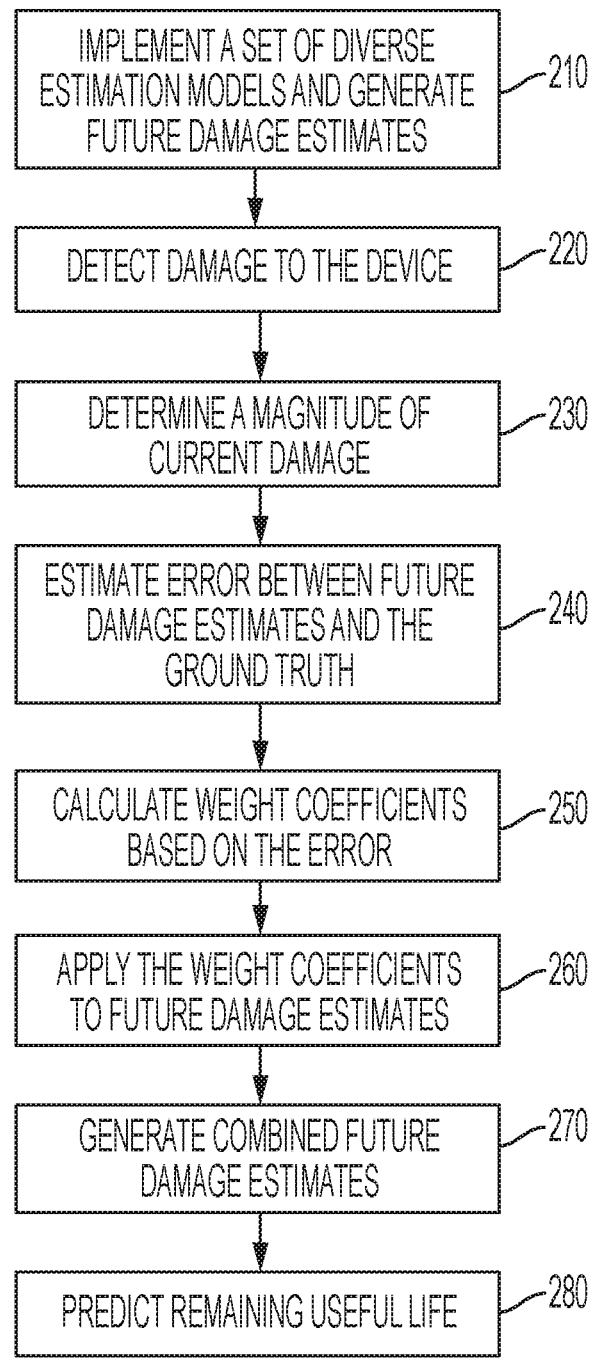
FIG. 2 is a flow diagram illustrating a process for estimating remaining useful life of a component in accordance with some embodiments.

FIG. 2 is a flow diagram of a process implemented by the system 100. The process involves implementing 210 a set of diverse estimators that generate future damage estimates for a component. Each estimator, n, generates a future damage estimate, $y_{ni}$, for the component at each life unit, i, of the component. The estimators may determine the future damage estimates based on one or more stressors on the component such anticipated load conditions and/or anticipated environmental conditions. The damage to the component is detected 220. The magnitude of the current damage, $gt_i$, of the component for each life unit, i, can be determined 230 based at least in part on the detected damage. The error, $e_{ni}$, between the future damage estimate, $y_{ni}$, and the magnitude of the current damage, $gt_i$, at each life unit, i, is estimated 240. Weights, $w_{ni}$, for each future damage estimate, $y_{ni}$, are calculated 250. The future damage estimates of all the estimators are fused by applying 260 the calculated weights respectively to the future damage estimates at each life unit, i, and combining the weighted future damage estimates to generate 270 the fused future damage estimate at each life unit. The remaining useful life of the component is predicted 280 based on the fused future damage estimate.

Consider a set of estimators that have diverse performances during execution. As discussed above, performance of an estimator can be encapsulated as error at a given life unit. In some embodiments, the weights are inversely proportional to the error of the estimator One technique for determining weights is referred to as symmetric weighting of errors and is described below.

The error, $e_{ni}$, for estimator n at life unit i is represented by the Equation 2:

$$e_{ni}=(gt_i-y_{ni}) \qquad [2]$$

where $gt_i$ is the current damage to the component (ground truth), and $y_{ni}$ is the future damage estimate of the $n^{th}$ estimator. Smoothing the error to filter the higher order error such as by using a weighted average will yield less erratic results. In some embodiments, the filter may be an exponential moving average filter with a smoothing constant, $\alpha$, as set forth in Equation 3:

$$e_{ni}=\alpha*e_{ni-1}+(1-\alpha)*e_{ni} \qquad [3]$$

The weight, $w_{ni}$, for the $n^{th}$ of N estimators at life unit i can be expressed as the maximum of the errors for all the estimators $e_i \ldots e_N$ divided by the absolute value of the error for the estimator:

$$w_{ni} = \frac{\max(e_{1i} \ldots e_{ni})}{|e_{ni}|} \quad [4]$$

Figure 3:
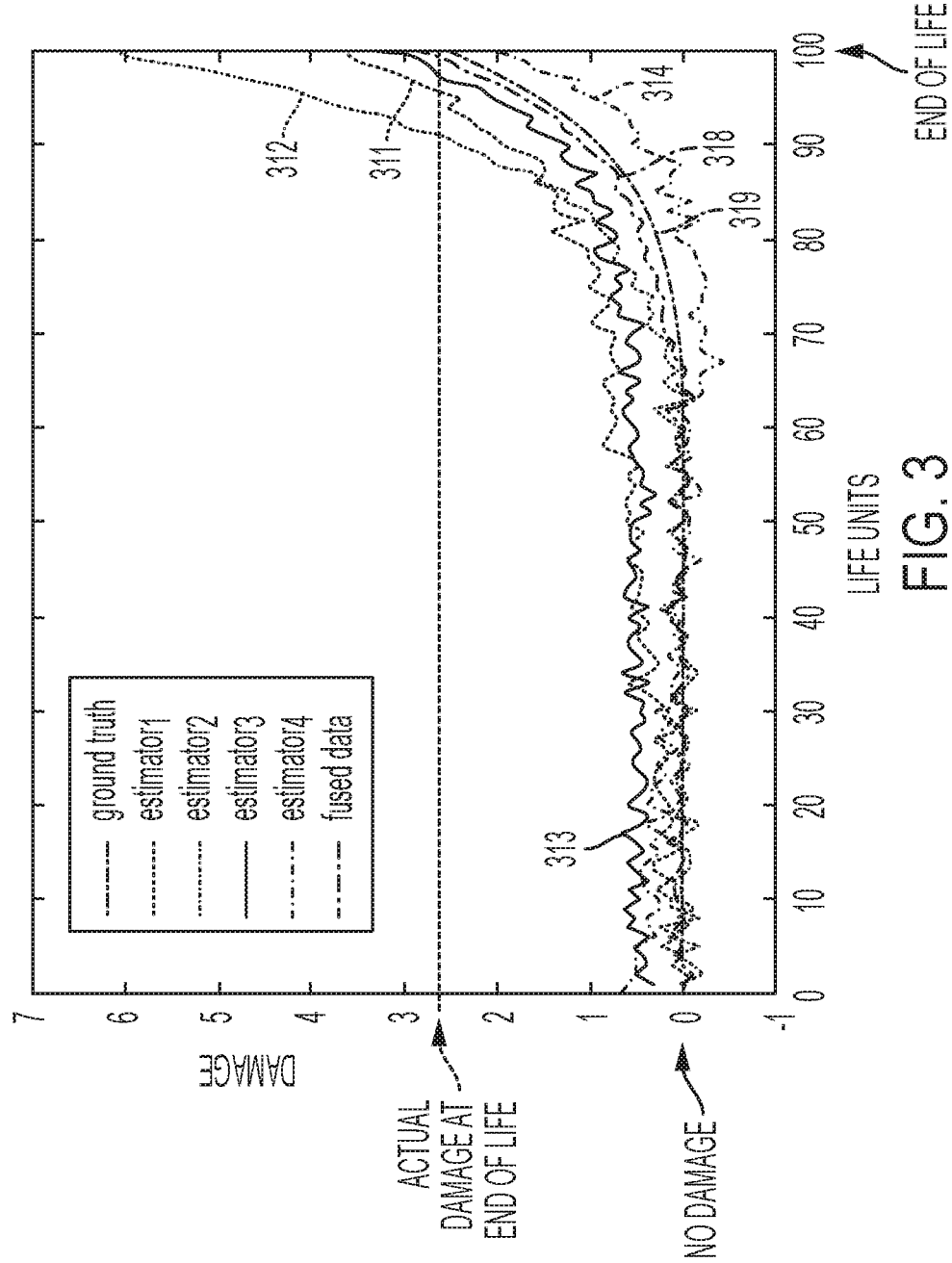
FIG. 3 shows superimposed graphs of the future damage estimation trajectories, damage, and fused damage estimation using a symmetric weighting approach obtained using systems and processes in accordance with some embodiments.

As an illustrative example, consider the four estimator trajectories 311, 312, 313, 314 as shown in FIG. 3. The trajectories 311, 312, 313, 314 represent the estimated damage to the component on the y axis during a portion of the life of the component as measured by life units along the x axis. The x axis represents life units of the component in which damage progresses from some point where no damage is present to the end of life. The damage (ground truth) trajectory 319 is also plotted in FIG. 3 superimposed with the estimated damage trajectories 311, 312, 313, 314 of estimators 1, 2, 3, and 4. The damage at end of life is indicated on the y axis of FIG. 3. The estimated damage trajectories 311, 312, 313, 314 of estimators 1 through 4 vary by how closely they follow the ground truth trajectory 319. In particular, the estimated damage trajectories 311, 312, 313, 314 of estimators, 1, 2, and 3 underestimate the life unit at which end of life occurs towards the end, predicting that the end of life occurs earlier than the ground truth trajectory 319 at end of life. The estimated damage trajectory 314 of estimator 4 overestimates the life unit at end of life, predicting that the end of life will occur at a later life unit than the actual end of life according to the ground truth trajectory 319.

The estimated damage trajectory 314 of estimator 4 overestimates the damage in the first part of the trajectory compared to the ground truth trajectory and underestimates the damage nearer end of life. The trajectory 313 of estimator 3 has a relatively constant overestimation bias for damage with respect to the ground truth trajectory 319. The trajectory 312 of estimator 2 is close to the ground truth trajectory 319 initially and then starts to overestimate the damage after about life unit 65. The estimated damage trajectory 311 of estimator 1 also starts close to the ground truth trajectory 319, then deviates away. FIG. 3 also shows the fused estimated damage trajectory 318 superimposed with the estimated damage trajectories 311, 312, 313, 314 of the four estimators and the ground truth trajectory 319.

Figure 4:
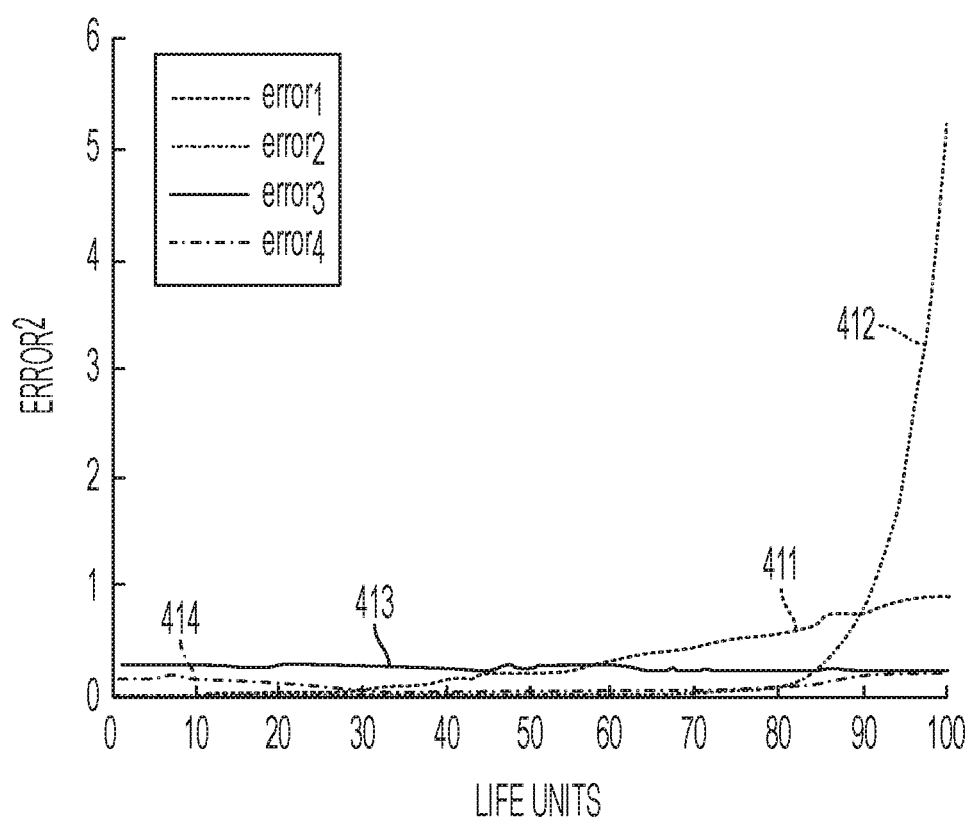
FIG. 4 shows superimposed graphs of the squared error for the future damage estimations in accordance with some embodiments.

FIG. 4 shows the squared error $e_n(i)^2 = (gt(i) - y_n(i))^2$ for each estimator trajectory as a function of remaining life. It will be appreciated from observation of FIG. 4 that the trajectory of estimator 1 has an increasing squared error 411, the trajectory of estimator 2 shows an initially small squared error 412 that subsequently exponentially increases, trajectory of estimator 3 shows a substantially constant squared error 413, and the trajectory of estimator 4 has initial offset in squared error 414 that decreases, then increases again.

Figure 5:
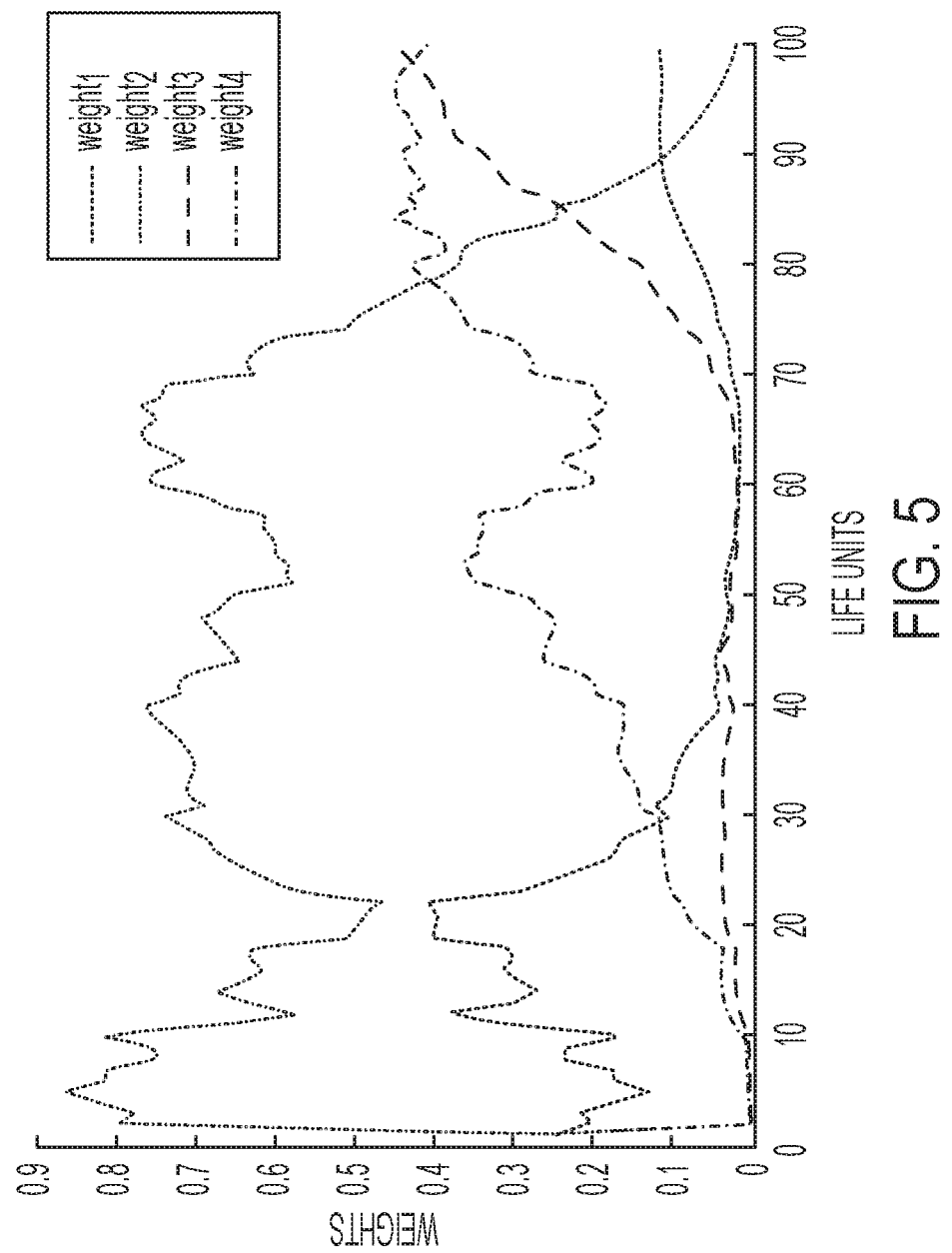
FIG. 5 shows superimposed graphs of the weights calculated for the future damage estimates using a symmetric weighting approach in accordance with some embodiments.

Symmetric weighting of errors according to Equations 2-4 for the four estimators is shown in the superimposed graphs FIG. 5. The weights for estimator 1 are initially high, then the weights drop off where the predicted damage trajectory of estimator 1 (shown in FIG. 3) deviates from the ground truth damage. The initially high weights for the predicted damage trajectory of estimator 2 drops off due to the exponentially increasing error of the predicted damage trajectory for estimator 2. The weight for estimator 3 is initially low due to the bias of the predicted damage trajectory of estimator 3, but the weight increases towards the end of life because of the relative accuracy of the predicted damage trajectory of estimator 3 with respect to the ground truth increases—even though the bias is still there. The weight for the predicted damage trajectory of estimator 4 is small initially because the predicted damage trajectory shows a bias which then disappears in mid-life. Even though the predictions of estimator 4 underestimate the damage with respect to the ground truth damage at end of life, the performance of estimator 4 is relatively better compared to the predictions of estimator 1 and estimator 2.

The weights are applied to the predicted damage estimates of estimators 1, 2, 3, and 4 and the weighted predicted damage estimates are fused. For example, for each estimator, the weights at each life unit may be multiplied by the predicted damage estimate for each estimator and then the weighted damage estimates are summed such that the fused result at each life unit, i, is provided by Equation 5:

$$f_i = \sum_{n=1}^{N} w_{ni} * y_{ni} \quad [5]$$

The final fused damage estimate trajectory 318 as a function of life unit f(i) shown in FIG. 3 reflects a reasonable trade-off between the different trajectories and approximates the ground truth reasonably well. For prognostic applications, this is a desirable property. As can be seen in Table 1, the root mean squared (RMS) error for the fused error is considerably lower than the RMS of any individual estimator.

TABLE 1

| Estimator | RMS ERROR |
| --- | --- |
| Estimator1 | 6.46 |
| Estimator2 | 8.97 |
| Estimator3 | 5.14 |
| Estimator4 | 3.31 |
| Fused estimator | 1.12 |

In certain implementations, it is desirable to underestimate the remaining useful life of the component. Underestimation is often useful when the fault mode towards the end of life has exponential properties that may be associated with modalities that commence only towards the final stages of component life. Where this is the case, overestimation of remaining life may lead to failure before action can be taken. Therefore, in some embodiments, the process of obtaining the fused damage estimate ensure estimators that routinely overestimate remaining useful life of the component are penalized more heavily than estimators that underestimate the remaining useful life. In other words, early estimators (estimators that predict end of life at an earlier life unit) are weighted more heavily than late estimators (estimators that predict end of life at a relatively later life unit). Weighting the future damage estimates of estimators that underestimate remaining useful life relatively more heavily and weighting the future damage estimates of estimators that overestimate remaining useful life relatively less heavily is referred to herein as asymmetric weighting.

Referring back to FIG. 1, in asymmetric weighting, the weight calculator 150 is configured to skew the weights toward underestimation of the remaining useful life. For example, the weight calculator 150 may calculate relative larger weights for estimators that underestimate the remaining useful life and calculate relatively smaller weights for estimators that overestimate the remaining useful life.

Figure 6:
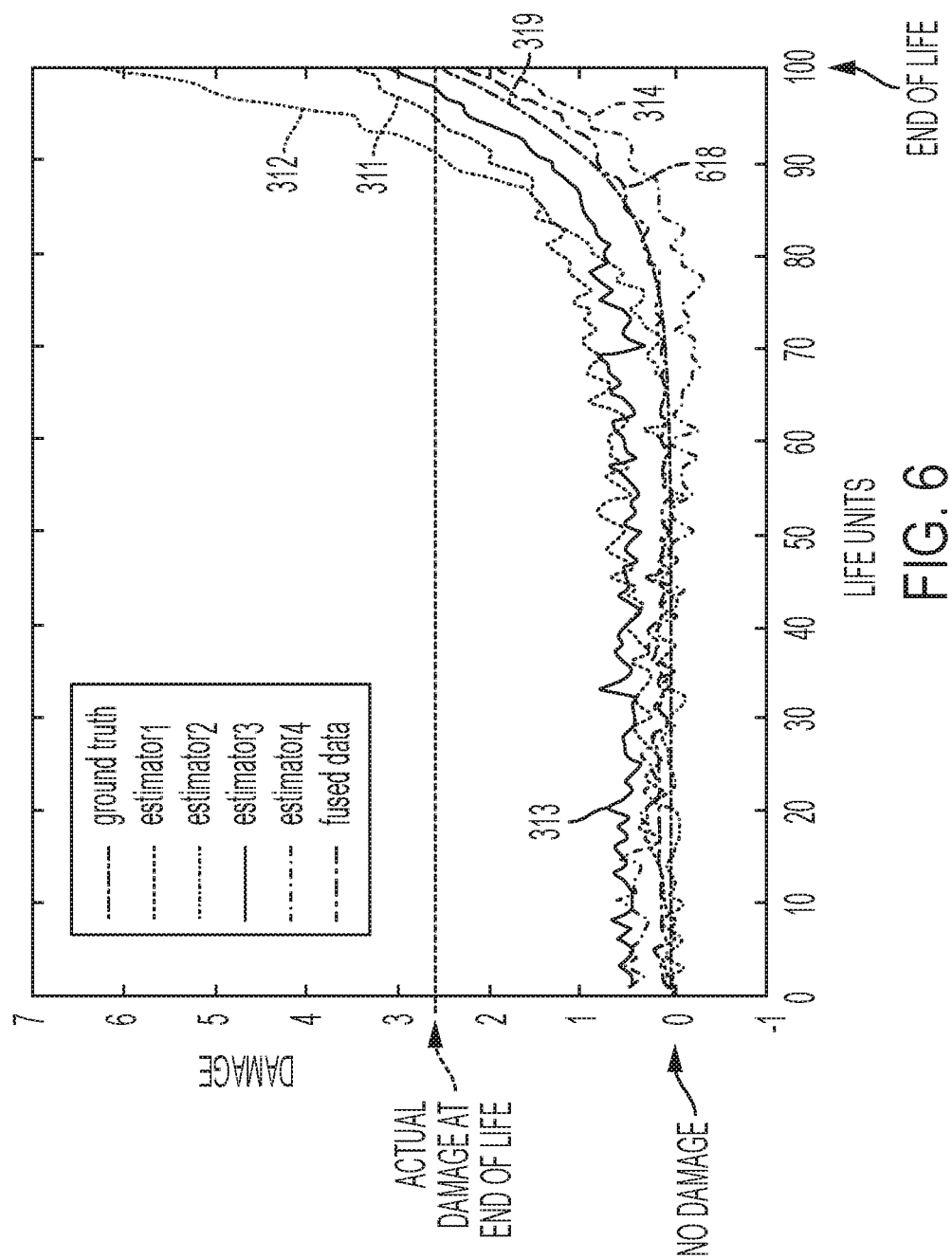
FIG. 6 shows superimposed graphs of the future damage estimation trajectories, actual damage, and fused damage estimation using a asymmetric weighting approach obtained using systems and processes in accordance with some embodiments.

In an embodiment, the asymmetric weighting can be realized by computing the error for each estimator, n, at life unit, i, according to Equation 6:

$$e_{ni} = \exp - \frac{y_{ni} - \text{ground truth}}{scalar_1} \text{ if } y_{ni} - \text{ground truth} < 0 \qquad [6]$$

$$\exp \frac{y_{ni} - \text{ground truth}}{scalar_2}$$

otherwise,

In general, $scalar_1$ can be any value and $scalar_2$ can be any value, however, in one particular embodiment, $scalar_1=10$ and $scalar_2=0.4$. After the errors are calculated using Equation 6, the asymmetric weights may be computed as in Equation 4. The weights are applied to the future damage estimates of the estimators and the weighted future damage estimates for all estimators are fused life unit-by-life unit to produce the fused future estimated damage trajectory. Trajectories 311, 312, 313, 314 of the future damage estimate trajectories of estimators 1, 2, 3, and 4, the current damage 319, and the fused estimated damage trajectory 618 according to the asymmetric weighting approach are shown in the superimposed graphs in FIG. 6. As can be seen in FIG. 6, the fused damage estimate 618 produced by asymmetric weighting gravitates towards the future damage estimate trajectory 314 of estimator 4 near the end of life, due to the higher weighting of the future damage trajectory 314 of estimator 4 for negative error.

In this example, according to the ground truth trajectory 319, end of life occurs when the damage has a value of 2.7 at life unit 100. From observation of FIG. 6, it is apparent that estimators 1, 2, 3 near end of life are early estimators because the life unit at which sufficient damage to cause end of life (Damage=2.7) occurs at an earlier life unit (<100) than the end of life of the ground truth trajectory 319. For estimator 1, damage reaches 2.7 at about life unit 90; for estimator 2, damage reaches 2,7 at about life unit 94; and for estimator 3, damage reaches 2.7 at about life unit 96. Estimator 4 is an estimator that makes late estimates because the life unit at which estimator 4 predicts end of life occurs at a later life unit (>100) than the end of life of the ground truth trajectory 319.

Figure 7:
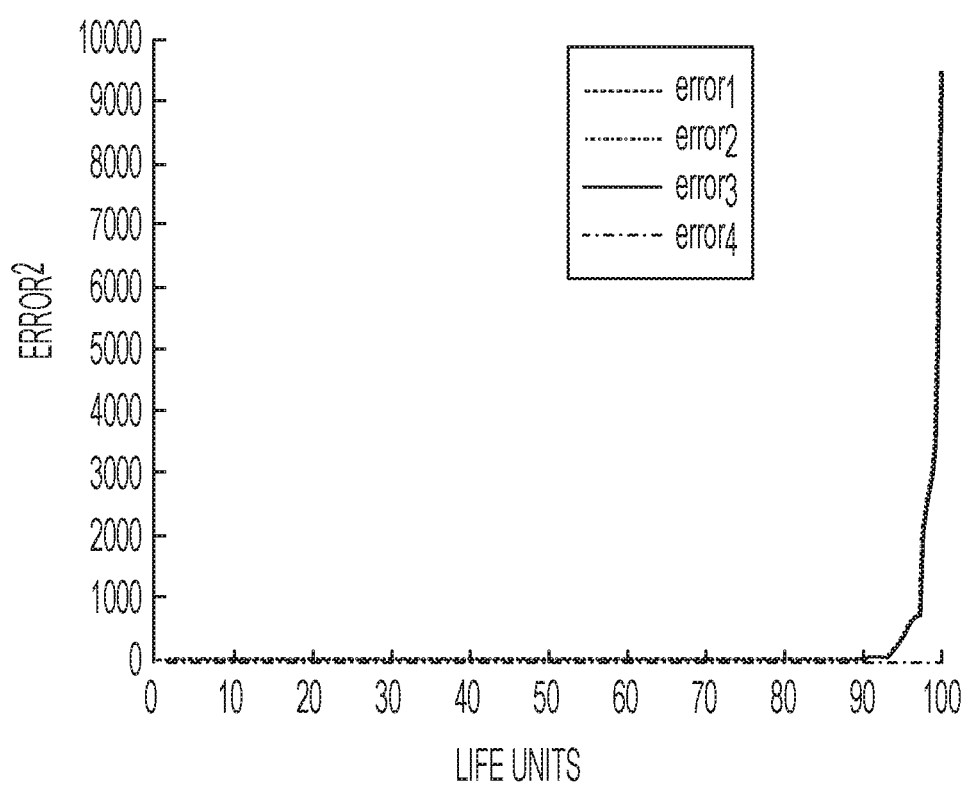
FIG. 7 shows superimposed graphs of the squared error for the future damage estimations in accordance with some embodiments.
Figure 8:
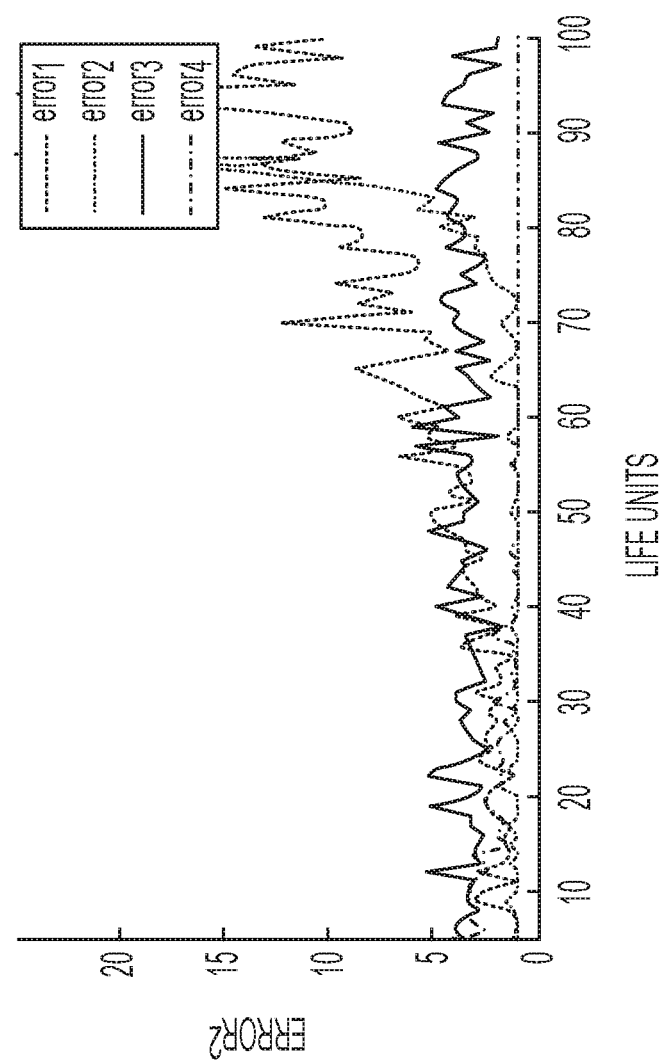
FIG. 8 is shows a zoomed in portion of FIG. 7.

FIG. 7 shows superimposed graphs of the squared errors for each future damage estimate trajectories calculated using Equation 6. FIG. 8 shows a zoomed in portion of the graphs of FIG. 7.

After the errors are calculated using Equation 6, the asymmetric weights may be computed as in Equation 4. Superimposed graphs of the asymmetric weights 811, 812, 813, 814 are shown respectively in FIG. 9 for estimators 1-4. The weights 811 for the future damage estimates of estimator 1 start out relatively high and then decrease toward the end of life because estimator 1, compared to the other estimators, makes estimates that are initially relatively premature about the future damage early on and the estimates become relatively more late nearer the end of life. The weights 812 for the future damage estimates of estimator 2 again start out relatively high and then begin a sharp decrease at about life unit 65. Estimator 2 makes estimates that are initially rather premature but the estimates becomes quite late toward the end of life. The weights 813 for estimator 3 remain relatively constant, increasing slightly toward the end of life. Estimator 3 tracks the ground truth fairly closely but its estimates are slightly more late toward the end of life. The weights 814 for estimator 4 start out relatively low but rise with increasing life units as estimations from estimator 4 becomes increasingly early.

The weights are applied to the future damage estimates for each of the estimators and the fused future damage estimate is determined. The fused future damage estimate is shown as one of the superimposed graphs of FIG. 6.

The RMS error for the future damage estimates of estimators 1-4 and the fused future damage estimate are shown in Table 2. Again, the fused future damage estimate shows a better result than any individual estimator alone. Compared to the results using symmetric error, the performance has decreased slightly, likely owing in part to the stochastic nature of noise and the forced bias of the fused ensemble which is not reflected in the error calculation (which is symmetric).

TABLE 2

| Estimator | RMS ERROR |
| --- | --- |
| Estimator1 | 6.57 |
| Estimator2 | 8.85 |
| Estimator3 | 5.15 |
| Estimator4 | 3.35 |
| Fused estimator | 1.52 |

Referring again to FIG. 1, according to some embodiments, the system 100 includes a memory 180 that stores knowledge of the amounts of underestimation of the future damage at end of life by one or more early estimation models and/or knowledge of the amounts of overestimation of the future damage at end of life by one or more late estimation models. In these embodiments, the weight calculator 150 is configured to calculate weights based on the knowledge of overestimation or underestimation.

In some embodiments, prior to generating the future damage estimates, the estimation processor 110 is configured to update at each life unit at least some of the estimation models based on the magnitude of current damage as obtained from the damage estimator 130. In other words, the operation of each estimator is modified based on the magnitude of the current damage so that at the next life unit a more accurate prediction of future damage is obtained. This implementation can be described as "re-grounding" one or more of the estimators at each life unit based on the magnitude of the current damage.

The system 100 can include a training subsystem 195 that trains the estimators 111, 112, 113, 114 to produce future damage estimates for the component 199. The training subsystem 195 may train the estimators 111, 112, 113, 114 using a machine learning approach, e.g., supervised or unsupervised machine learning. In some scenarios, the training subsystem 195 may be configured to train one of more of the estimators 111, 112, 113, 114 to underestimate the remaining useful life of the component. Alternatively or additionally, the training subsystem 195 may be configured to train one of more of the estimators to overestimate the remaining useful life of the component.

In some embodiments, weight assignment may be based on stage of life as illustrated by the embodiments described below. The stages of life may be determined by the stage of life estimator 185 shown in FIG. 1 based on direct or indirect inputs from the estimation processor 110, damage detector 120, damage estimator 130, models 170 and/or other components of the system 100. When the weight assignment is based on stage of life, the life of the component 199 is divided into two or more stages. Different weighting processes may be used for different life stages. For example, one stage of life may use a symmetric weighting scheme whereas another stage of life may use an asymmetric weighting scheme. Other weighting schemes could alternatively be used.

In many implementations, the error at any particular life unit is not known because the damage (namely, time to failure) at that life unit is only available a posteriori. In this scenario, weights may be assigned using an estimated error based on understanding the historical error characteristics during a particular phase of end-of-life.

In some implementations it can therefore be helpful to methodically divide the remaining useful life of a component into different stages. For example, the life of the component could be divided into the stages "early", "middle" and "late". For example, the "early" stage can be defined as the stage of life that has not exhibited a degradation-accelerated fault. It is the "normal" operating regime in which the component undergoes ordinary wear, typically manifested by small (often quasi-linear) changes in the performance parameters.

The "middle" stage, in contrast, is the period after a fault has been detected in the component. In the system 100 of FIG. 1, fault conditions are identified by the reasoner processor 190. In some scenarios, a fault condition may be manifested by a univariate symptom detectable based on a single measurement by the damage detector 120 of a performance parameter. In some scenarios, a fault condition may be detectable based on multivariate symptoms extracted by the reasoner processor 190 through advanced signal processing and identified via either model-based diagnostics (e.g., based on one or more models 170 of the component 199) or data-driven diagnostics (e.g., based on one or more performance parameters detected by the damage detector 120). In some embodiments, no assumptions are made with regards to how the fault condition was initiated. That is, the detected fault could be a fault condition that worsened and exceeded an observable threshold or it could be a discrete and relatively sudden change that can be observed in the sensor data (or features of the sensor data). The features are calculated to optimally accentuate the fault detectability using typical methods found in the domain. Depending on application, these could be a combination of sensor measurements (for example derived through principle component analysis) or features obtained from the sensor data by transposing vibration data into the frequency domain through Fourier transforms.

The last stage of component life, denoted the "late" stage, is characterized by an exponentially changing damage signature of the future damage trajectory (where the damage signature includes all descriptions of either features of the trajectory (e.g., peaks, derivative, rise time, etc.), or future estimate values of the trajectory. In some scenarios, the late stage may not be well separated from the "middle" stage. In these scenarios, the late stage can be defined by a subjective threshold that separates it from the middle stage. One motivation for separating the late stage from the middle stage stems from the realization that often times, additional fault mechanisms drive the very late stage of component faults. However, these mechanisms are often times not included in the estimators, therefore resulting in poor performance of the estimators towards the end of life. As a guideline, setting the threshold for the "late" stage might attempt to capture the last 15% of life after a fault has been first detected. In some scenarios, the process used to determine the stages of life does not have a priori access to ground truth, so it needs to be trained to cue off a relevant measurable performance parameter or a computable "health" parameter. For example, the future damage estimates generated by the estimators 111, 112, 113, 114 can be considered to be health parameters.

In accordance with some embodiments, the early life stage is a stage in which the component has not experienced a fault condition that exceeds a first predetermined fault threshold. The middle life stage is a stage in which the component has experienced a fault condition that exceeds the first fault threshold. The late life stage is a stage in which the component has experienced a fault condition that exceeds a second predetermined fault threshold.

Figure 10:
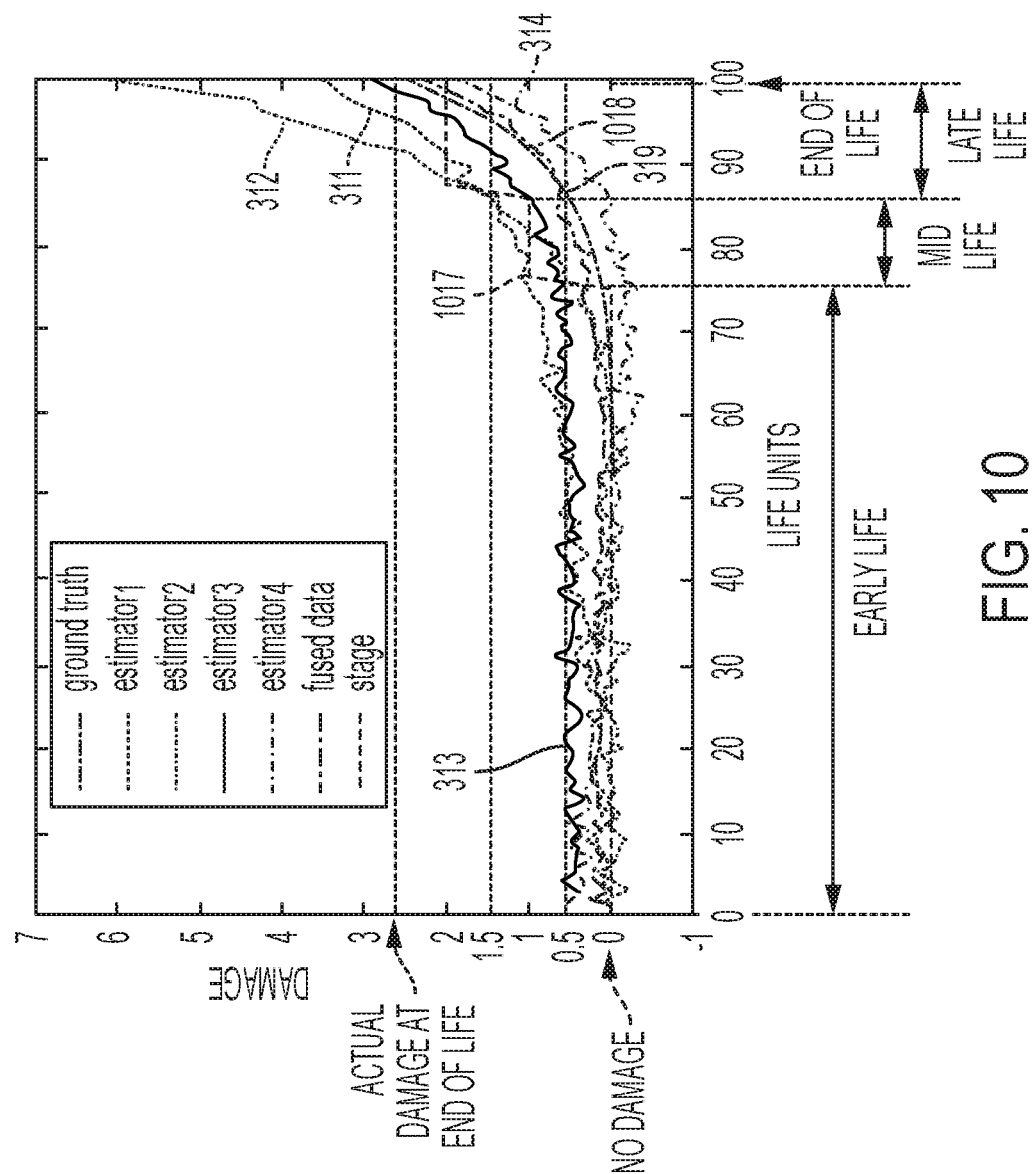
FIG. 10 shows superimposed graphs of the future damage estimation trajectories, actual damage, and fused damage estimation with indication of early, middle, and late stages of life in accordance with some embodiments.

FIG. 10 illustrates early, middle, and late life stages superimposed on the trajectories 311, 312, 313, 314 of future damage estimates of the estimators 1-4, the ground truth damage trajectory 319, and the fused future damage estimate trajectory 1018. FIG. 10 shows the life stage tracker 1017 where damage value 0 means "early" life, damage value 1 is interpreted as "mid-level", and damage value 2 means "late". In this particular case, the classification of the stage values is based on the trajectory 312 of estimator 2 as a driver where the mid-level damage threshold was set to 0.5 damage units and the late threshold was set to 1.5 damage units. It will be understood that other threshold values could be used for other scenarios. Note also that for this particular case, the stage assignment for the "late" stage occupies more time than the "middle" stage. For the purpose of this example a larger "late" stage is more desirable and reflects the preferences for a particular solution. It is conceivable that in some scenarios, the middle stage or late stage weight assignments may be completely absorbed by their neighboring stage. That is, there may be no middle stage or no late stage.

Figure 9:
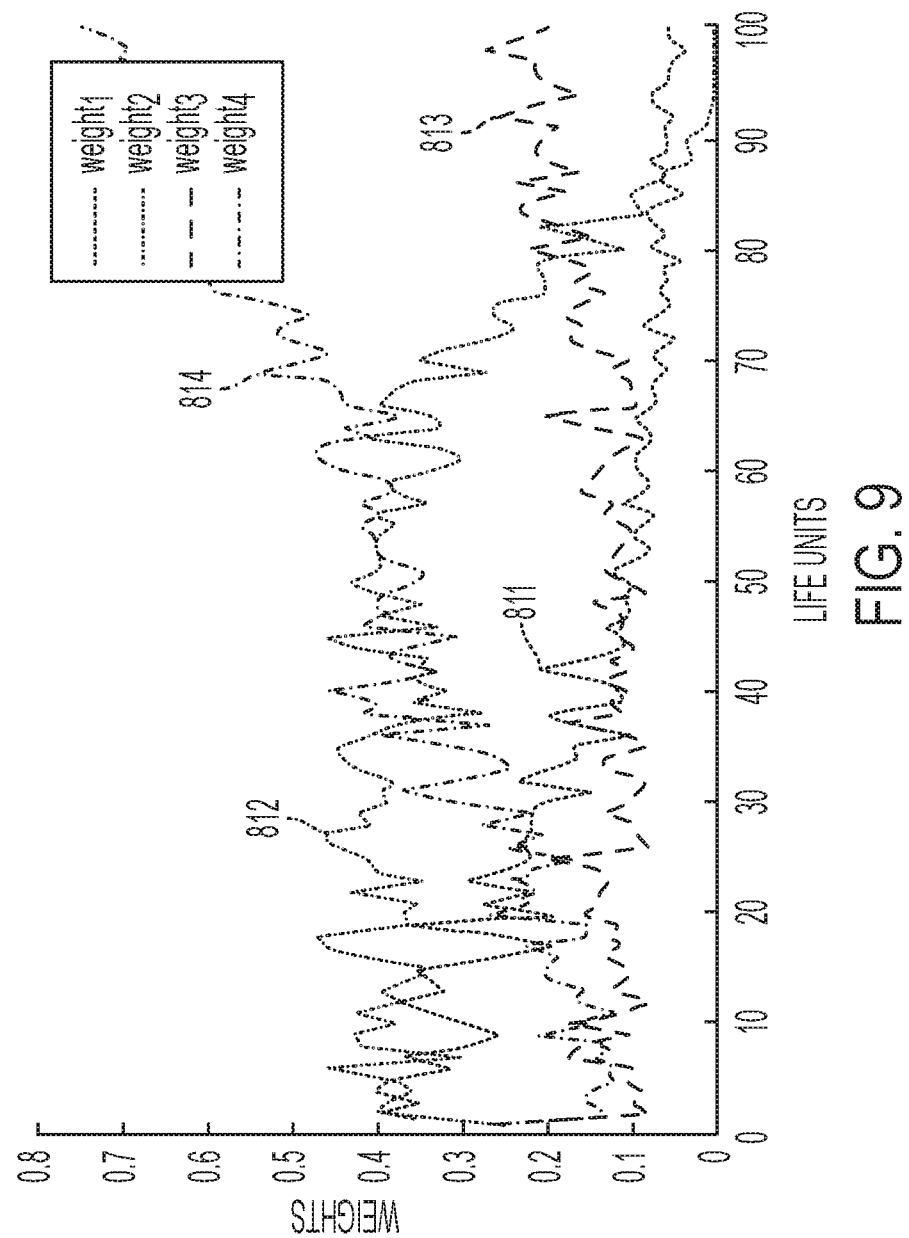
FIG. 9 shows superimposed graphs of the weights calculated for the future damage estimates using an asymmetric weighting approach in accordance with some embodiments.
Figure 11:
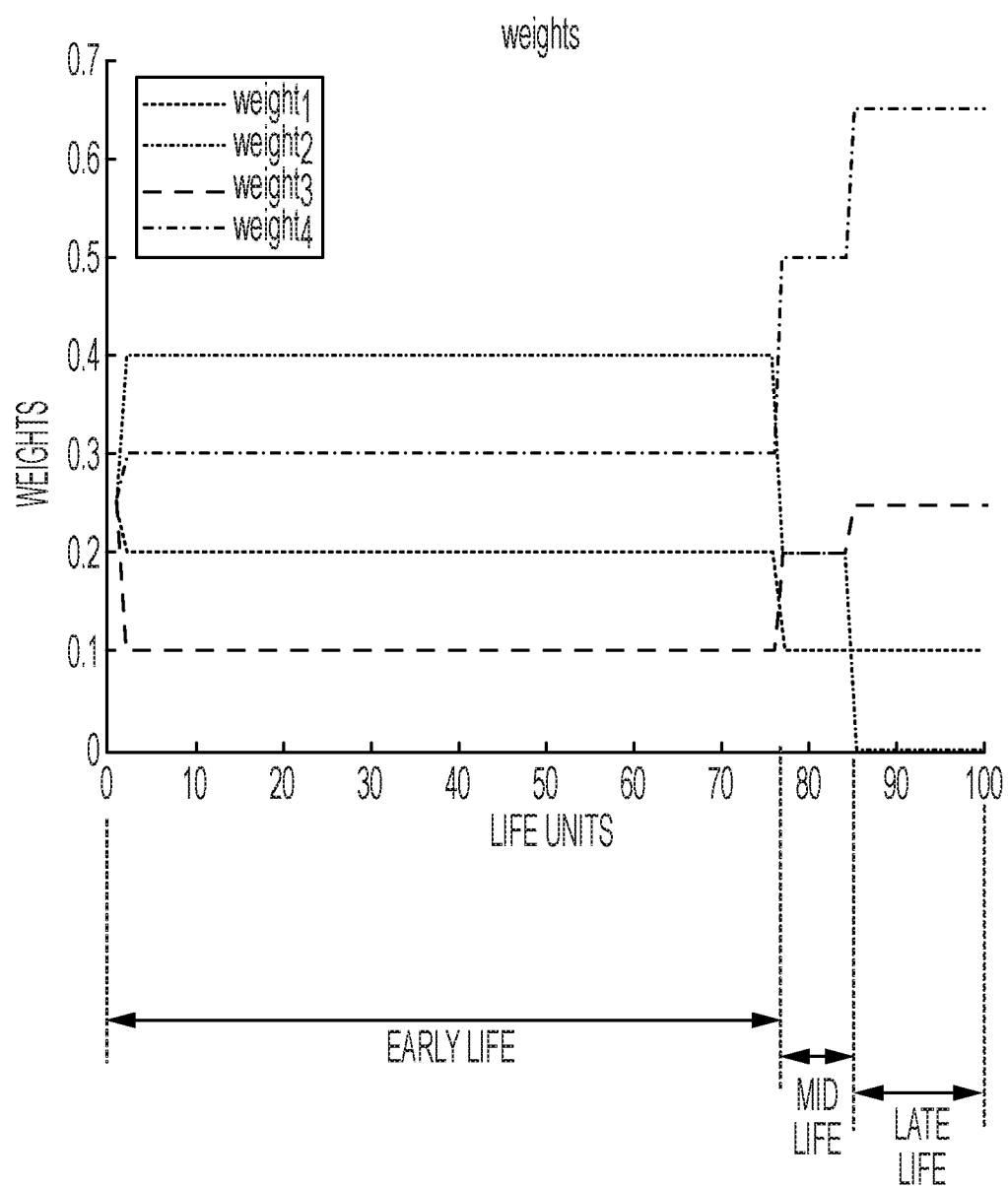
FIG. 11 shows superimposed graphs of the weights calculated for the future damage estimates during early, middle, and late life stages in accordance with some embodiments.

FIG. 11 shows the weights which reflect the average approximate weight calculated via the asymmetric error assignment method described above. Superimposed graphs of the asymmetric weights are shown in FIG. 9 for estimators 1-4. Estimator 1, compared to the other estimators, makes estimates that are initially relatively premature about the future damage and its estimates become relatively more late at mid and late life. Thus, the weights for the future damage estimates of estimator 1 start out relatively high during early life and then decrease at the beginning of middle life. Decreased weights continue during middle and late life.

Estimator 2 makes estimates that are relatively early during early life but they become the most late of all the estimators toward the end of life. The weights for the future damage estimates of estimator 2 again start out relatively high and then sharply decrease at the beginning of middle life. The weights for estimator 2 again sharply decrease at the beginning of late life. These decreases in weights reflect the optimism of estimator 2 during these life stages.

Estimator 3 is the estimator that initially most closely tracks the actual damage (ground truth) but the estimates become earlier at end of life. The weights for estimator 3 are low initially but increase slightly at the beginning of middle life and increase again slightly at the beginning of late life.

Estimator 4 is the estimator with the earliest estimates at the late stage of life although its estimates are fairly late during early life. The weights for estimator 4 start lower during early life but increase significantly at the beginning of middle life and increase significantly again at the beginning of the late life stage due to the rising pessimism of estimator 4.

Figure 12A:
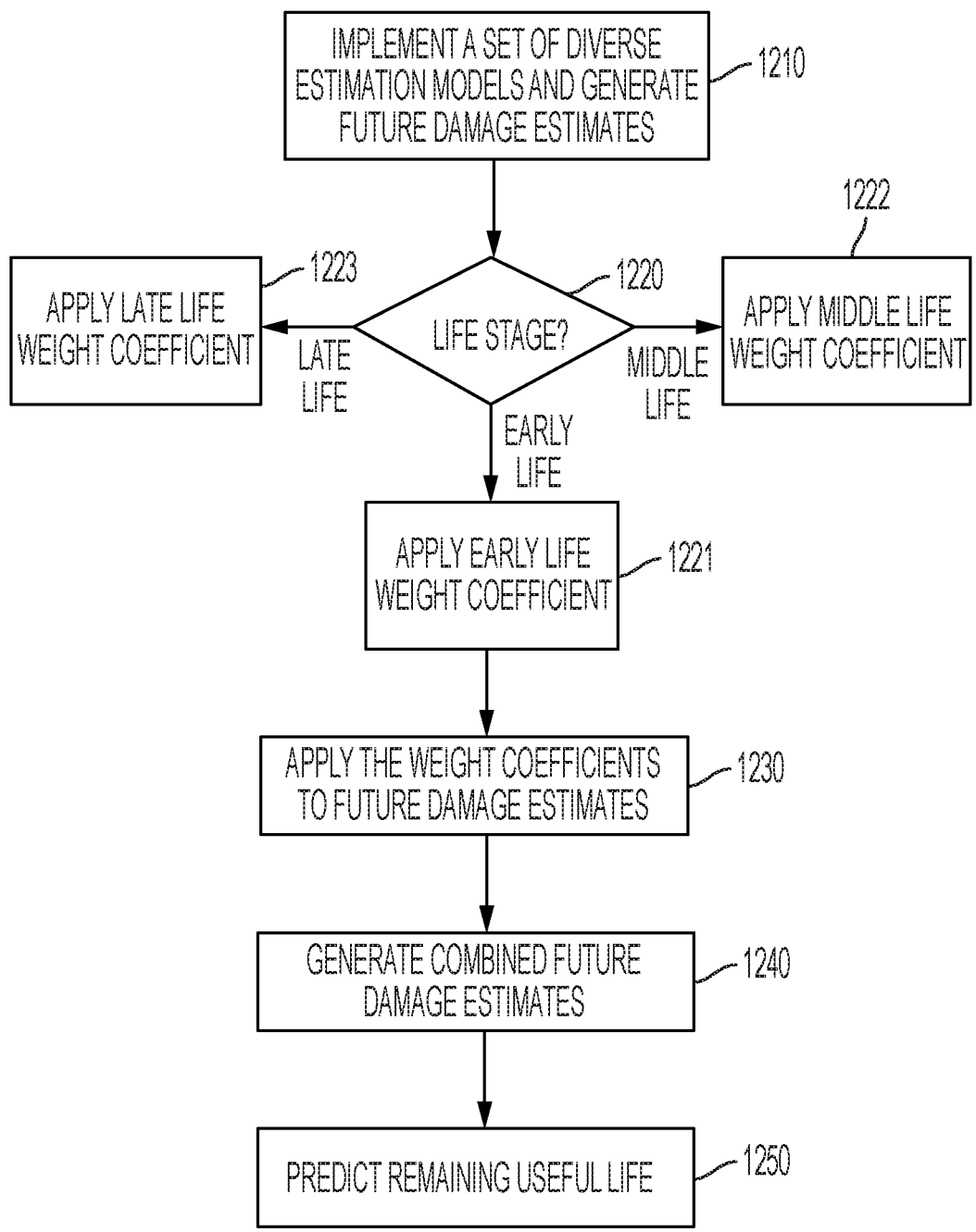
FIGS. 12A and 12B are flow diagrams illustrating a process for determining remaining useful life in accordance with some embodiments.
Figure 12B:
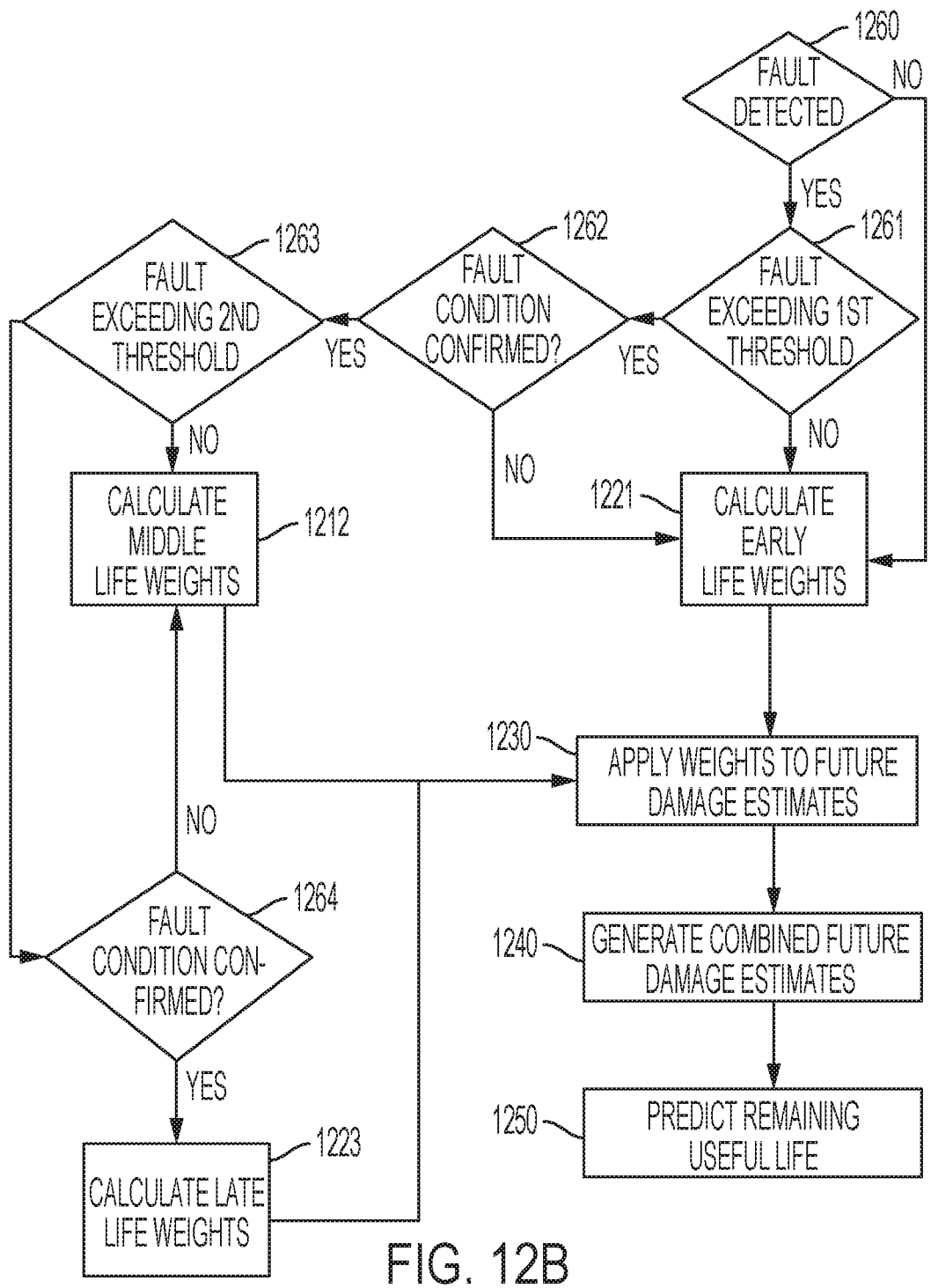

FIGS. 12A and 12B are flow diagrams that illustrate a process for determining remaining useful life of a component in accordance with some embodiments. Referring to the flow diagram of FIG. 12A and the system block diagram shown in FIG. 1, the estimation processor (110, FIG. 1) implements 1210 a diverse set of estimators (111, 112, 113, 114, FIG. 1) that each generate future damage estimates for the component (199, FIG. 1). A stage of life estimator (185, FIG. 1) determines 1220 the life stage of the component (199, FIG. 1). If the stage of life estimator determines 1221 that the stage of life is early life, then early life stage weights are calculated by the weight calculator (150, FIG. 1). If the stage of life estimator determines 1222 that the stage of life is middle life, then middle life stage weights are calculated by the weight calculator (150, FIG. 1). If the stage of life estimator determines 1223 that the stage of life is late life, then late life stage weights are calculated by the weight calculator (150, FIG. 1). The future damage estimates of all the estimators (111, 112, 113, 114 FIG. 1) are fused by applying 1230 the weights respectively to the future damage estimates at each life unit, i, and combining the weighted future damage estimates to generate 1240 the combined future damage estimates for each life unit. The remaining useful life of the component is predicted 1250 based on the combined future damage estimates.

FIG. 12B is a flow diagram that provides additional details about the operation of the reasoner processor (190, FIG. 1) in accordance with some embodiments. The stage of life processor 185 can be configured to determine early, middle, and late life stages of the component (199, FIG. 1) based on detected or estimated fault conditions. Component fault conditions may be determined by the reasoner processor 190 based on information from the damage estimator (130, FIG. 1), the model (170, FIG. 1), the estimation processor (110, FIG. 1), and/or or other components of the system 100. If no fault condition has been detected 1260, or if a detected fault condition is below 1261 a first fault threshold, then the early life stage weights may be calculated 1221. Optionally, the reasoner processor may confirm 1262 the presence and/or amount of the first fault condition to ensure that an actual fault condition above the first fault threshold exists.

If the detected fault condition is above 1261 a first fault threshold and below 1263 a second fault threshold, middle life weights are calculated 1222. If the fault condition exceeds 1263 the second fault threshold, late life stage weights may be calculated 1223. Optionally, the reasoner processor may confirm 1264 the presence and/or amount of the second fault condition to ensure that an actual fault condition above the second fault threshold exists. The weights are applied 1230 to the future damage estimates provided by the estimators. A combined future damage estimate is generated 1240 and used to predict 1250 the remaining useful life of the component.

According to some embodiments, the process used to calculate weights is based on a prognostic horizon that represents the remaining useful life of the component. According to some embodiments, the reasoner processor (190, FIG. 1) is configured to detect a fault condition of the component (199, FIG. 1). When a fault condition that is above a threshold is detected, the reasoner processor triggers the calculation of a prognostic horizon that represents the remaining useful life of the component. Before the prognostic horizon the weight calculator may use a first algorithm to determine the weights for the estimators. During the prognostic horizon, the weight calculator may use a second algorithm, different from the first algorithm, to determine the weight for the estimators. The fusion processor aggregates the weighted future damage estimates and predicts the remaining useful life of the component based on the aggregated future damage estimate.

Referring again to FIG. 1, according to some implementations, after the reasoner processor 190 detects the fault condition, the reasoner processor 190 then confirms the fault condition of the component before triggering the calculation of the prognostic horizon. For example, the reasoner processor 190 may delay a final confirmation of the fault condition for additional units of time or cycles (life units) after the fault condition is initially detected to ensure that implementation of the prognostic horizon is based on an actual fault condition rather than noise, outlier information or other spurious conditions. In some scenarios, the reasoner processor 190 detects the fault condition based on a first source of information, e.g., information from the damage detector 120, model 170 and/or damage estimator 130, and confirms the fault condition using a different source of information, e.g., information from the future damage estimates of the estimators 111, 112, 113, 114. In some scenarios, the reasoner processor 190 detects the fault condition based on the future damage estimates of the estimators 111, 112, 113, 114 and confirms the fault condition using information from the damage detector 120 and/or damage estimator 130.

Figure 13:
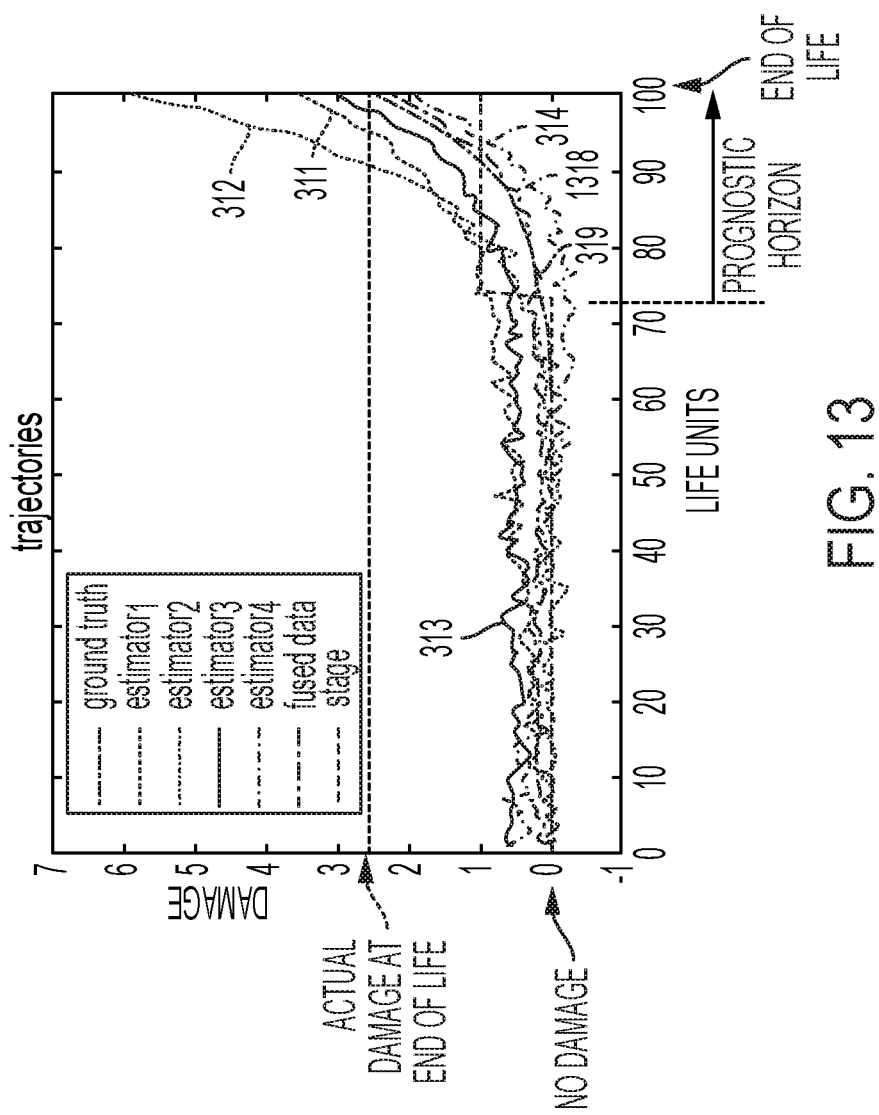
FIG. 13 shows superimposed graphs of the future damage estimates of the estimation models, the actual damage, and the fused damage estimation calculated using first weights prior to a prognostic horizon and using second weights after the prognostic horizon in accordance with some embodiments.
Figure 14:
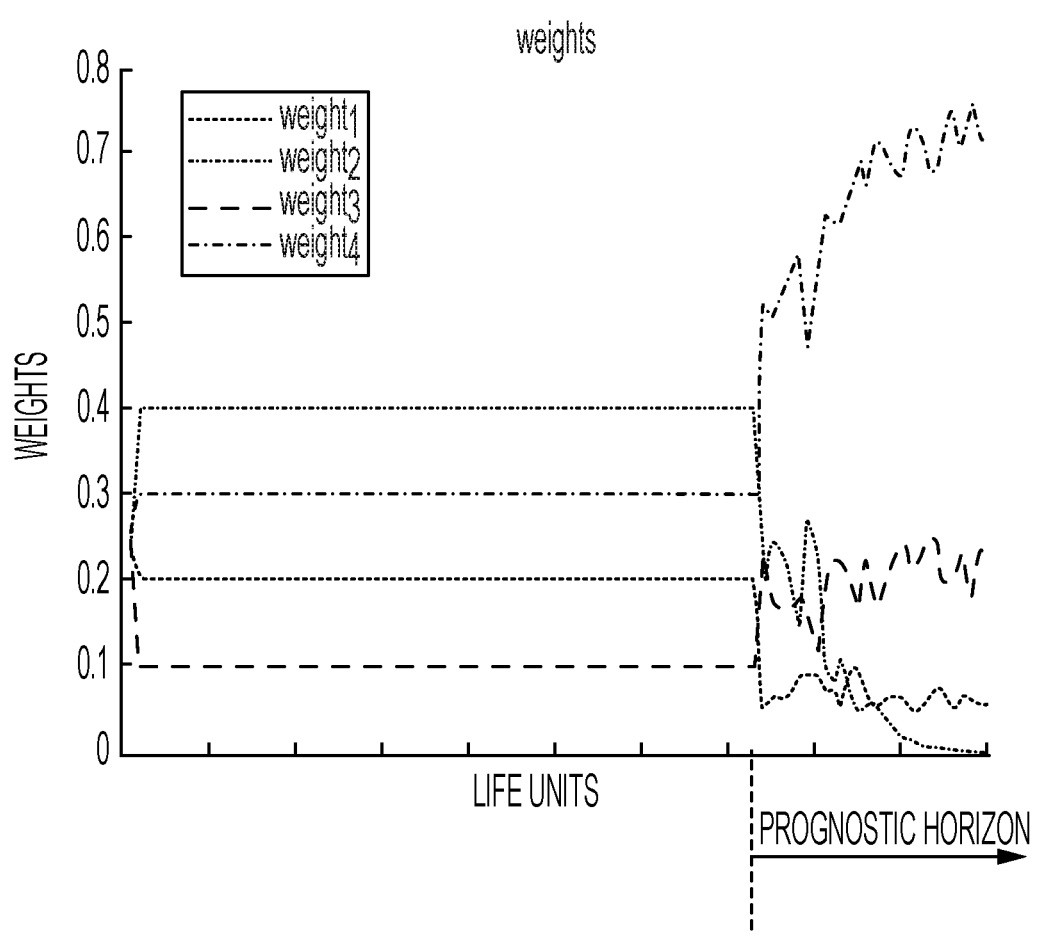
FIG. 14 shows superimposed graphs of the weights used to determine the fused estimation of FIG. 13.

FIG. 13 shows superimposed trajectories 311, 312, 313, 314 of the future damage estimates of the estimators, the ground truth 319, and the fused damage estimation trajectory 1318 calculated using first weights prior to a prognostic horizon and using second weights during the prognostic horizon period. FIG. 14 shows superimposed graphs of the weights used to determine the fused estimation trajectory 1318 of FIG. 13.

In some scenarios, the operating conditions of the component 199 may change. The reasoner processor 190 may be configured to update the prognostic horizon based on changes in the anticipated load conditions of the component 199, the anticipated environmental conditions of the component 199, and/or other conditions that could affect the lifespan of the component 199. Information about the anticipated load conditions, the anticipated environmental conditions and/or other lifespan-affecting conditions may be obtained from operator or mission schedules or typical operational cycles that describe a process, for example. According to some embodiments where the magnitude of current damage, $gt_i$, can be obtained by the damage estimator 130, the prognostic horizon may be updated based on the magnitude of current damage. In situations where the prognostic horizon is updated, the weights may also be updated accordingly. In some embodiments, the life stages, e.g., early, middle, late, are determined to occur after the prognostic horizon. In these situations, where the prognostic horizon is updated, the weights may also be updated to correspond to the updated life stage.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A system comprising:
an estimation processor configured to implement a set of diverse estimation models that generate future damage estimates for a component, each estimation model using a different algorithm to generate a different future damage estimate, $y_i$, for the component at each of a plurality of life units, i, of the component based on one or more anticipated stressors of the component, wherein the anticipated stressors include at least one of anticipated load conditions and anticipated environmental conditions, wherein the future damage is a prediction by each different algorithm of incremental degradation to the component that accumulates in the future due to the anticipated stressors;
at least one damage detector configured to detect damage to the component;
a damage estimator configured to estimate a magnitude of current damage, $gt_i$, of the component for each life unit, i, based at least in part on the detected damage, the current damage being a current accumulation of degradation to the component;
an error processor configured to estimate an error, $e_i$, between each future damage estimate, $y_i$, and the magnitude of current damage, $gt_i$, for each life unit, i;
a weight calculator configured to calculate weights, $w_i$, for the future damage estimates, each weight being inversely proportional to the error; and
a fusion processor configured to:
combine the future damage estimates of the estimation models by:
applying the calculated weights respectively to future damage estimates providing weighted future damage estimates; and
generating a combined future damage estimate by combining the weighted future damage estimates; and
predict a remaining useful life of the component based on the combined future damage estimate.

2. The system of claim 1, further comprising at least one model of the component, wherein the magnitude of current damage is based on estimations obtained from the model.

3. The system of claim 1 wherein at each life unit, i, the weight, $w_i$, for the future damage estimate, $y_i$, is a maximum of errors of future damage estimates of the estimation models 1 to N, $\max(e_1, e_2, \ldots, e_N)$ for the life unit, i, divided by an absolute value of the error, $|e_i|$ for the future damage estimate, $y_i$.

4. The system of claim 1, wherein the weight calculator is configured to skew the weights toward underestimation of the future damage.

5. The system of claim 1, wherein the weight calculator is configured to:
calculate relatively larger weights for damage estimates of estimation models that underestimate the remaining useful life of the component; and
calculate relatively smaller weights for damage estimates of estimation models that overestimate the remaining useful life of the component.

6. The system of claim 1, further comprising a memory that stores knowledge of overestimation of future damage by at least one estimation model and knowledge of underestimation of future damage by at least another estimation model.

7. The system of claim 1, wherein, prior to generating the future damage estimates, the estimation processor is configured to update at each life unit at least some of the estimation models based on the magnitude of current damage to obtain a more accurate prediction at a next life unit.

8. The system of claim 1, further comprising a stage of life estimator configured identify multiple stages of life of the component and to calculate the weights based on a current stage of life of the component.

9. The system of claim 8, wherein the stage of life estimator is configured to identify:
an early life stage in which the component has not experienced a fault condition that exceeds a first fault threshold; and
later life stages in which the component has experienced a fault condition that exceeds a predetermined fault threshold.

10. The system of claim 1, further comprising a reasoner processor configured to detect a fault condition of the component, wherein the reasoner processor is configured to calculate a prognostic horizon of the remaining useful life of the component in response to the fault condition.

11. The system of claim 10, wherein the fault condition is detected based on a first source of information, and wherein the reasoner processor confirms the fault condition of the component before triggering the calculation of the prognostic horizon from a second source of information different from the first source of information.

12. The system of claim 10, wherein the weight calculator is configured to calculate the weights based on one or both of the prognostics horizon and a life stage of the component within the prognostic horizon.

13. The system of claim 12, wherein the reasoner processor is configured to update the prognostic horizon based on changes in anticipated stressors of the component and/or the magnitude of current damage, $gt_i$, and wherein the weight calculator is configured to calculate the weights based on one of multiple stages of life of the component that occur after the updated prognostic horizon.

14. The system of claim 1, further comprising a training subsystem configured to train at least one estimation model to overestimate the remaining useful life of the component and/or to underestimate the remaining useful life of the component.

15. The system of claim 1, wherein:
the estimation processor is configured to detect outlier future damage estimates; and
the weight calculator is configured to set the weights corresponding to the outlier future damage estimates to zero.

16. A method comprising:
implementing a set of diverse estimation models that generate future damage estimates for a component, each estimation model using a different algorithm to generate a different future damage estimate, $y_i$, for the component at each of a plurality of life units, i, based on one or more anticipated stressors of the component, wherein the anticipated stressors include at least one of anticipated load conditions and anticipated environmental conditions, wherein the future damage is a prediction by each different algorithm of incremental degradation to the component that accumulates in the future due to the anticipated stressors;
detecting damage to the component;
estimating a magnitude of current damage, $gt_i$, of the component for each life unit, i, based at least in part on the detected damage, the current damage being a current accumulation of degradation to the component;

estimating an error, $e_i$, between each future damage estimate, $y_i$, and the magnitude of current damage, $gt_i$, for each life unit, i;

calculating weights, $w_i$, for the future damage estimates, each weight being inversely proportional to the error; and combining the future damage estimates comprising:

applying the calculated weights respectively to future damage estimates providing weighted future damage estimates; and generating a combined future damage estimate by combining the weighted future damage estimates; and predicting a remaining useful life of the component based on the combined future damage estimate.

17. The method of claim 16, wherein calculating the weights comprises skewing the weights toward overestimation of the future damage.

18. The method of claim 16, further comprising:
identifying multiple stages of life of the component, and calculating the weights based on a current stage of life of the component.

19. The method of claim 16, further comprising triggering a prognostic horizon of the remaining useful life, wherein calculating the weights comprises calculating the weights during the prognostic horizon.

20. The system of claim 1, wherein the at least one damage detector detects the damage to the component via a sensor that senses a performance parameter of the component, and wherein the damage estimator estimates the magnitude of the current damage based on determining a trend of the performance parameter and estimating the current damage based on the trend.

21. The system of claim 1, wherein the damage estimator estimates the magnitude of the current damage based on a physics model of the component, taking into account:

past and present load conditions of the component; and past and present environmental conditions of the component.

* * * * *